(12) United States Patent
Gallati

(10) Patent No.: US 8,838,267 B2
(45) Date of Patent: Sep. 16, 2014

(54) COMPUTER-CONTROLLED CONVEYOR SYSTEM AND CONVEYING METHOD

(75) Inventor: Rudolf Gallati, Neuhaus (CH)

(73) Assignee: Ferag AG, Hinwil (CH)

( * ) Notice: Subject to any disclaimer, the term of this patent is extended or adjusted under 35 U.S.C. 154(b) by 491 days.

(21) Appl. No.: 13/143,919

(22) PCT Filed: Nov. 25, 2009

(86) PCT No.: PCT/CH2009/000377
§ 371 (c)(1),
(2), (4) Date: Aug. 29, 2011

(87) PCT Pub. No.: WO2010/078664
PCT Pub. Date: Jul. 15, 2010

(65) Prior Publication Data
US 2011/0301746 A1      Dec. 8, 2011

(30) Foreign Application Priority Data
Jan. 12, 2009    (CH) .......................................... 38/09

(51) Int. Cl.
*B65G 45/08*        (2006.01)
*B65G 43/10*        (2006.01)

(52) U.S. Cl.
CPC *B65G 43/10* (2013.01); *B25B 25/14* (2013.01)
USPC ............. 700/229; 700/28; 271/270; 271/283; 198/781.05

(58) Field of Classification Search
USPC ........................................................ 700/229
See application file for complete search history.

(56) References Cited

U.S. PATENT DOCUMENTS 5,022,644 A * 6/1991 Burge ........................... 271/270
6,918,588 B2 * 7/2005 Müller .......................... 271/283

(Continued)

FOREIGN PATENT DOCUMENTS

DE      43 38 810 A1      5/1994
EP      0 324 900 A1      7/1989

(Continued)

OTHER PUBLICATIONS

International Search Report dated Mar. 31, 2009, issued by European Patent Office, in the corresponding application CH 382009.

(Continued)

*Primary Examiner* — Gene Crawford
*Assistant Examiner* — Kyle Logan
(74) *Attorney, Agent, or Firm* — Knobbe, Martens, Olson & Bear, LLP

(57) ABSTRACT

In a computer-controlled conveying system (3), virtual markers (K1-K10) are generated and are stored in association with a conveying element (31, 32, 33, 34). The virtual markers (K1-K10) each comprise a marker position which is based on the current position of the conveying element (31, 32, 33, 34) at the time of generation. A search is carried out for stored virtual markers (K1, K5, K6, K9) which have a relative position with respect to the associated conveying element (31, 32, 33, 34) that lies within a defined sector (T1, T2, T3) at the search time. Actuators of the conveying system (3) are driven depending on whether virtual markers (K1, K5, K6, K9) were found in the defined sector (T1, T2, T3) during searching. The virtual markers (K1-K10) may be applied to the conveying elements (31, 32, 33, 34) with dynamically changing distances, for example, and make it possible to drive actuators in a flexible manner independently of a fixedly defined clock rate.

21 Claims, 8 Drawing Sheets

(56) References Cited

U.S. PATENT DOCUMENTS

| | | | |
|---|---|---|---|
| 6,985,779 B2* | 1/2006 | Hsiung et al. | 700/19 |
| 8,083,021 B2 | 12/2011 | Reinelt et al. | |
| 2002/0121076 A1* | 9/2002 | Nakagawa et al. | 53/493 |
| 2007/0261941 A1* | 11/2007 | Pelak et al. | 198/781.05 |
| 2008/0208370 A1* | 8/2008 | Bowers et al. | 700/28 |

FOREIGN PATENT DOCUMENTS

| | | | |
|---|---|---|---|
| EP | 0 457 112 B1 | 3/2000 | |
| EP | 1 431 187 A | 6/2004 | |
| EP | 0 717 354 B1 | 8/2007 | |
| EP | 1 964 802 A2 | 9/2008 | |
| EP | 2 224 303 B1 | 1/2011 | |
| EP | 2 091 321 B1 | 7/2012 | |

OTHER PUBLICATIONS

International Search Report issued by European Patent Office in the corresponding application PCT/CH2009/000377.

* cited by examiner

COMPUTER-CONTROLLED CONVEYOR SYSTEM AND CONVEYING METHOD

This application is the U.S. National Phase under 35 U.S.C.§371 of International Application PCT/CH2009/00377, filed Nov. 25, 2009, which claims priority to Swiss Application No. 00038/09, filed Jan. 12, 2009, the entireties of which are hereby incorporated herein by reference.

TECHNICAL FIELD

The present invention relates to a computer-controlled conveying system and to a computer-controlled conveying method. The present invention relates, in particular, to a computer-controlled conveying system and to a computer-controlled conveying method in which use is made of at least one conveying element having a drive which has a position sensor for indicating the current position of the conveying element.

PRIOR ART

In known conveying systems for flexible flat items such as printed products, the items are transported by conveying elements and further-processing machines at a fixed system clock rate. For this purpose, the individual conveying elements and further-processing machines are generally fully mechanically coupled and the entire conveying system is started in a synchronized manner during operation for the purpose of fitting components and processing and is shut down when operation is terminated or interrupted. On account of the forces which occur as a result of the mechanical coupling between the individual cascaded system components, the feasible total length of such conveying systems is physically limited. In addition, the system-wide mechanical clock rate synchronization has the disadvantage that flexible and/or dynamic adaptations, for example to different and/or varying product sizes, can scarcely be carried out or can be carried out only in a very inefficient manner. In particular, the combination of fixedly clocked conveying systems with unclocked continuously supplied products also entails synchronization and coordination problems. For example, in the case of an "endless" supply of packaging film, the problem of the film being able to stretch and/or of items being able to move on the film exists.

DESCRIPTION OF THE INVENTION

One object of the present invention is to propose a computer-controlled conveying system and a computer-controlled conveying method which do not have at least some disadvantages of the known systems. In particular, one object of the present invention is to propose a computer-controlled conveying system and a computer-controlled conveying method which make it possible to adapt to different product sizes in a flexible and/or dynamic manner. In particular, another object of the present invention is to propose a computer-controlled conveying system and a computer-controlled conveying method which make it possible to combine fixedly clocked conveying elements with continuously supplying conveying elements.

According to the present invention, these aims are achieved, in particular, by the elements in the independent claims. Further advantageous embodiments also emerge from the dependent claims and the description.

The abovementioned aims are achieved by the present invention, in particular by virtue of the fact that, in a computer-controlled conveying system comprising at least one conveying element having a drive and a position sensor for indicating a current position of the conveying element, virtual markers associated with the conveying element are generated, a search is carried out for virtual markers within a defined sector, and an actuator of the conveying system is driven depending on whether virtual markers are found in the defined sector. The virtual markers are each stored with a marker position which is based on the current position of the conveying element at the time of generation. The marker position of a virtual marker is respectively calculated, for example, on the basis of the current position of the associated conveying element at the time of generation and a measurable distance value from a system zero point, which value is associated with the marker generator. A search is carried out for those virtual markers which have a relative position with respect to the associated conveying element that lies within a defined sector at the search time. The relative position of a virtual marker is respectively calculated, for example, on the basis of its marker position and the current position of the associated conveying element at the search time. The actuator is driven, in particular, on the basis of the marker position of a virtual marker found in the relevant sector. As a result of the fact that the virtual markers are generated and associated with conveying elements, markers are virtually applied to a conveying element and virtually move with the conveying element by virtue of their relative position changing with the movement of the relevant conveying element with respect to the current position of the relevant conveying element. Searching for the virtual markers within a defined sector in principle detects the markers virtually applied to the relevant conveying element within the sector. This makes it possible to apply virtual markers to the conveying elements in a flexible manner and with dynamically changing distances, for example, to detect said markers at freely definable points and to drive actuators, in particular drives, on the basis of the detection of said markers and the current relative position of the latter.

In one preferred embodiment variant, in the computer-controlled conveying system, the virtual markers are generated with product-specific distances between the marker positions, a current product position of a product conveyed on the conveying element is determined, and the marker positions are respectively varied on the basis of the current product position when generating a virtual marker. The drive of the conveying element has, for example, an adjustable speed, and a fixedly clocked conveyor for supplying flexible flat items is upstream of the conveying element. The computer-controlled conveying system then generates the virtual markers with distances according to length specifications associated with the items and, when generating a virtual marker, varies not only the distance from the preceding virtual marker but also the speed of the conveying element on the basis of current product positions of products on the conveying element. A film feeder for feeding a film provided with film markers to the conveying element is upstream of the conveying element, for example, and the conveying system comprises a sensor for determining the product position of the film on the basis of the film markers. The computer-controlled conveying system then generates the virtual markers with product-specific distances between the marker positions and respectively adapts the film feeder (forward feed) and the relevant marker position in an appropriate manner on the basis of a difference between the product position of the film and the marker position of a previously generated virtual marker when generating a virtual marker. Dynamically adapting the distance between the virtual markers and the speed of a relevant conveying element makes it possible, on the one hand, to adapt the virtual markers to the predefined clock rate of a feeder and, on the other hand, to synchronize them with the supply of a further product, in particular with the film markers of a supplied film.

In one embodiment variant, in the computer-controlled conveying system, a desired clock rate is determined on the basis of marker positions of virtual markers found in the defined sector, and a conveyor which is downstream of the conveying element and is intended to remove products is driven at the desired clock rate. The desired clock rate can thus be dynamically adapted to the current distribution (spacing) of the virtual markers on the conveying element.

In another embodiment variant, the drive of the conveying element has an adjustable speed, and the sector is defined on the basis of the speed of the conveying element in the computer-controlled conveying system. As a result of the speed-dependent positioning and/or length of a sector for detecting virtual markers, it is possible to carry out adaptation to the specific response time or switching time of actuators to be driven.

In another preferred embodiment variant, the computer-controlled conveying system comprises a sensor for detecting a product conveyed on the conveying element, which sensor is associated with the sector, and the actuator is driven on the basis of the detection of the product when a virtual marker lying in the sector is found. The virtual marker represents, for example, an intermediate space between successive items which is provided for the purpose of welding packaging, and the actuator is in the form of a welding bar. In this example, the sensor is in the form of a light barrier, and the welding bar is driven depending on whether the light barrier detects a conveyed item, which indicates a lack of separation of the items at the intended welding point and causes the welding bar to be lifted. In accordance with the response time of an actuator, the separation of items is thus detected early at a point of the conveying element defined by virtual markers, and the actuator is driven in a preparatory manner so that it assumes a defined desired position, for example, when the relevant virtual marker or the product positioned there reaches the actuator.

In another preferred embodiment variant, the computer-controlled conveying system comprises a plurality of conveying elements, and the computer-controlled conveying system transfers a virtual marker of a first conveying element to a downstream second conveying element when a transfer point to the downstream second conveying element is reached. At least some drives of the conveying elements preferably have different drive speeds, and the reaching of the transfer point is determined for a virtual marker of the first conveying element on the basis of the current position of the first conveying element. The virtual marker is associated with the downstream second conveying element at the transfer point, and the marker position of the virtual marker is adapted on the basis of the current position of the second downstream conveying element. In one variant, the computer-controlled conveying system determines the marker position of the virtual marker on the second conveying element on the basis of the speed of the first conveying element, the mass of a conveyed product and/or the type of conveyed product.

In addition to a computer-controlled conveying system and a computer-controlled conveying method, the present invention also relates to a computer program product comprising a computer-readable medium having computer code which is set up to control one or more processors of a control computer of a conveying system in such a manner that a current position of a conveying element is detected by the control computer, that virtual markers are generated in the control computer and are stored in association with the conveying element, the virtual markers each comprising a marker position which is based on the current position of the conveying element at the time of generation, that a search is carried out for virtual markers which are stored in the control computer and have a relative position with respect to the associated conveying element that lies within a defined sector at the search time, and that the control computer drives an actuator of the conveying system depending on whether virtual markers were found in the defined sector.

BRIEF DESCRIPTION OF THE DRAWINGS

One embodiment of the present invention is described below using an example. The example of the embodiment is illustrated by the following accompanying figures.

WAYS OF IMPLEMENTING THE INVENTION

Figure 1:
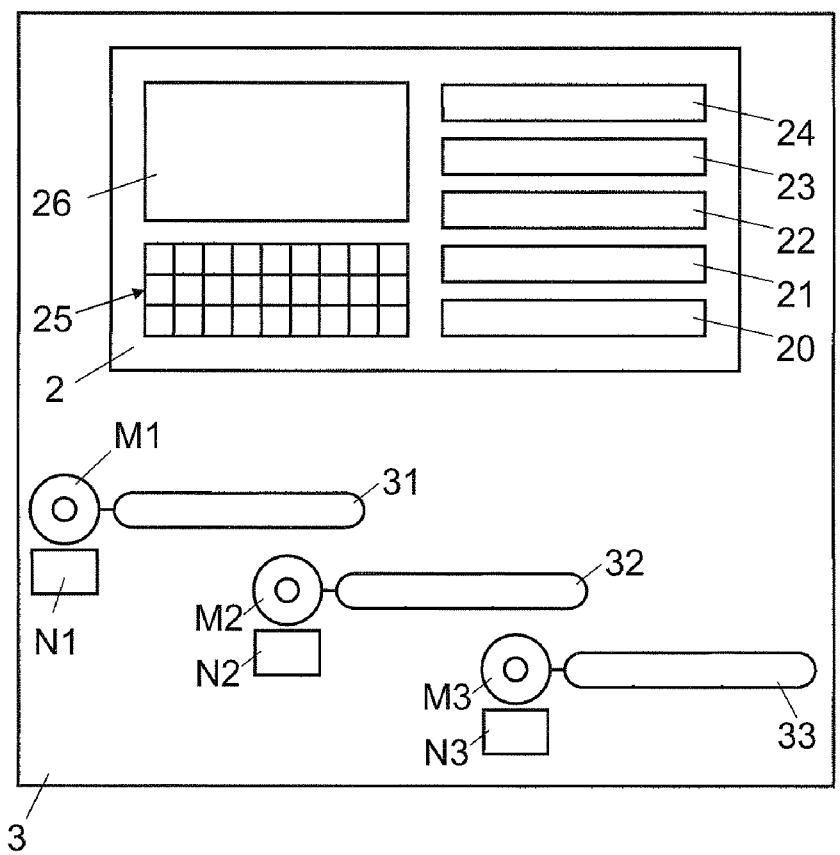
FIG. 1: shows a block diagram which schematically illustrates a computer-controlled conveying system having a plurality of conveying elements.

In FIG. 1, the reference symbol 3 relates to a computer-controlled conveying system having a plurality of conveying elements 31, 32, 33, for example conveyor belts, belt conveyors or chain conveyors, or other conveying elements, which convey flexible flat items, in particular printed products and other accompanying product items, for example CDs, over a defined transport distance along a straight or curved transport path. The conveying elements 31, 32, 33 are each driven by a drive M1, M2, M3 (electric motor). The drives M1, M2, M3 each comprise an electronic position sensor N1, N2, N3 which determines and indicates the current position of the relevant conveying element 31, 32, 33 in real time. The speed of the drives M1, M2, M3 is variable and controllable. Depending on the application, the conveying elements 31, 32, 33 run at various speeds which differ from one another.

As schematically illustrated in FIG. 1, the conveying system 3 comprises a (control) computer 2 having one or more processors, for example a PC for industrial use, data input elements 25, for example a keyboard or keys, a display 26, a data memory 20 and various functional modules. The functional modules comprise a marker generator 21, a marker search module 22, a transfer module 23 and a control module 24. The data input elements 25 and the display 26 may also be combined in a touch-sensitive screen. The functional modules are preferably in the form of programmed software modules which control one or more processors of the computer 2. The program code of the functional modules is stored on a computer-readable data storage medium which is fixedly or removably connected to the computer 2. A person skilled in the art will understand that the functional modules may be completely or at least partially in the form of hardware modules in different embodiment variants.

Figure 2:
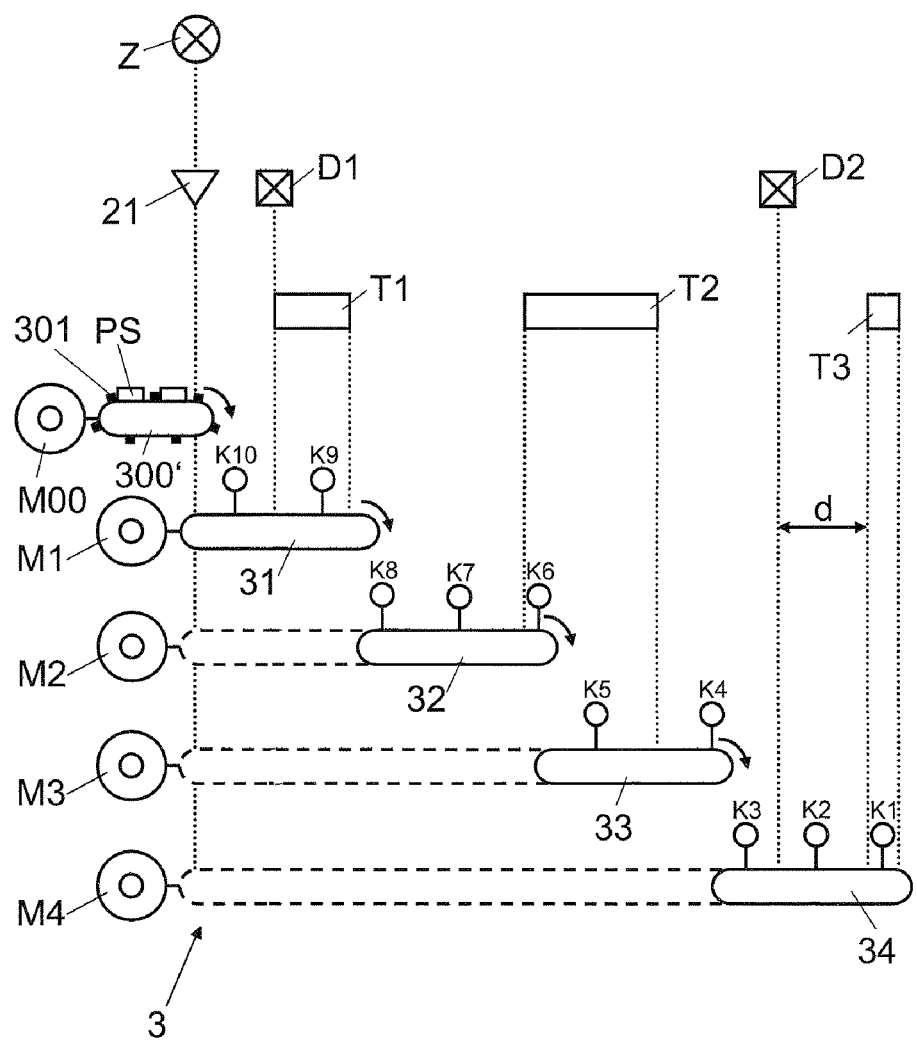
FIG. 2: shows a block diagram which schematically illustrates a model arrangement of a plurality of conveying elements with respect to a system zero point as well as virtual markers associated with the conveying elements.
Figure 3:
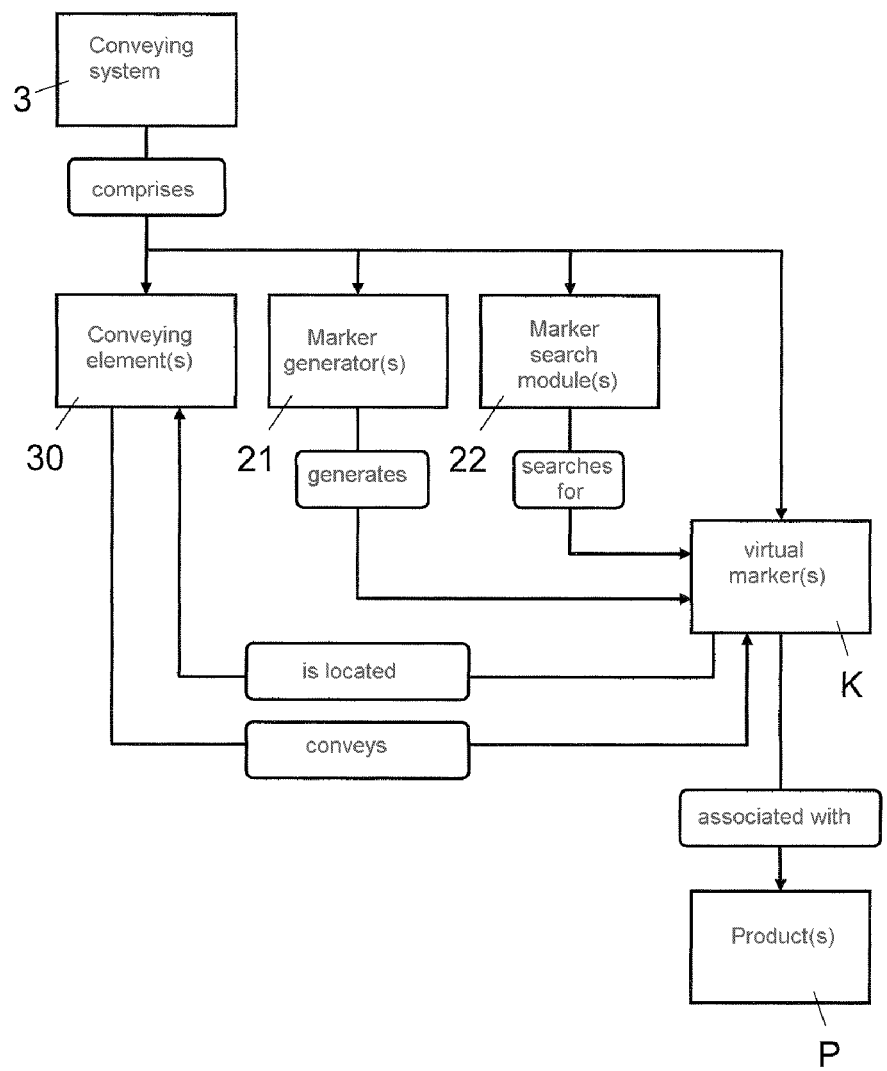
FIG. 3: shows a block diagram which schematically illustrates a model structure with the relationships between conveying elements, virtual markers, a marker generator and a marker search module.

As illustrated in FIG. 3, the conveying system 3 comprises one or more conveying elements 30, one or more marker generators 21 and one or more marker search modules 22. Depending on the embodiment variant, a marker generator 21 is implemented in a module which generates virtual markers at a plurality of different generating points in the conveying system 3, or a separate marker generator 21 is instantiated for each of these generating points (relative positions with respect to a system zero point Z, see FIG. 2, for example). In a corresponding manner, depending on the embodiment variant, a marker search module 22 is implemented in a module which searches for virtual markers in a plurality of different sectors, or a separate marker search module 22 is instantiated for each of these sectors.

As illustrated in FIG. 2, the conveying elements 31, 32, 33, 34 of the conveying system 3 are related to a common system zero point Z. That is to say, a (measurable) distance from the system zero point Z is associated with each conveying element 31, 32, 33, 34 and is stored in the data memory 20. The system zero point Z is a distinctive point in the system from which all involved elements of the conveying system 3 are at a defined distance which can be measured using a simple measuring tool, for example a tape measure. The conveying elements 31, 32, 33, 34 each have a current position which has its origin at the system zero point Z and is detected and updated by the position sensor N1, N2, N3 of the relevant drive M1, M2, M3, M4 in a slip-free manner in real time. The current position of a conveying element 31, 32, 33, 34 can be considered to be a point on a theoretically endless belt and is stated, for example, in millimetres, in another measure or as a purely numerical value. If the belt moves, this point moves away from the system zero point Z.

As illustrated in FIG. 2, the conveying elements 31, 32, 33, 34 have a defined sequence with respect to one another (for example cascaded), products each being transferred from a supplying conveying element to a removing conveying element at a transfer point. A conveyor 300' driven by the drive M00 supplies flexible flat items PS, for example at a fixed clock rate determined by transport cams 301, to the conveying element 31 at the defined system zero point Z.

FIG. 2 also illustrates defined sectors T1, T2, T3 of the conveying system 3 which have a region with a defined position and a defined length and are stored as a corresponding data structure in the data memory 20. A sector T1, T2, T3 is defined, for example, by a starting point at a defined distance from the system zero point Z and with a length. A sector T1, T2, T3 can also be defined by an end point, which is defined with respect to the system zero point Z, instead of by a length or a starting point. A sector may extend over a region of a single conveying element (for example T1, T3) or a plurality of conveying elements 31, 32, 33, 34 (for example T2).

In FIG. 2, the reference symbols D1 and D2 also relate to sensors, for example photosensors, light barriers or touch sensors, which are arranged at a defined distance from the system zero point Z and thus monitor a defined point of a conveying element 31, 34 using sensor technology.

Finally, FIG. 2 also schematically illustrates a marker generator 21 which is associated with a defined distance (generating point) from the system zero point Z; in the present example, the marker generator 21 is associated with the distance zero, with the result that the marker generator 21 is (virtually) arranged at a generating point at the system zero point Z. As described below, the marker generator 21 generates virtual markers which are each associated with a conveying element 31, 32, 32, 34 and have a marker position. The marker position mp is based on the current position p of the relevant conveying element 31 and on the defined position of the marker generator 21, for example on the distance g between the marker generator 21 and the starting point of the conveying element, mp=p−g. During generation, a virtual marker K1-K10 is respectively stored in the data memory 20 with its marker position mp and the associated conveying element 31, 32, 33, 34. The virtual markers K1-K10 are stored as a data structure and represent physical objects which are actually not on the relevant conveying element 31, 32, 33, 34, for example knobs or cams, or physical object boundaries which, although they do not yet actually exist on the associated conveying element 31, 32, 33, 34, are envisaged or expected at this point, for example the start of bags which are produced from a packaging film transported on the conveying element 31, 32, 33, 34, or are indeed actually present on the relevant conveying element 31, 32, 33, 34, for example items or the actual start of bags.

The marker generator 21 generates the virtual markers K1-K10 according to predefined rules or criteria. For example, product-specific length specifications are given to the marker generator 21 and the virtual markers K1-K10 are each generated at a corresponding distance from one another, that is to say a virtual marker K1-K10 is respectively generated when the current position of the relevant conveying element 31, 32, 33, 34 has increased according to the length specification. In another exemplary application, the virtual markers K1-K10 are generated according to predefined timing, that is to say a virtual marker K1-K10 is generated on the basis of the current position of the relevant conveying element 31, 32, 33, 34 after a defined interval of time. The generation of a virtual marker K1-K10 can also be triggered by other defined events in the conveying system 3, for example on the basis of and/or triggered by a sensor.

In the example in FIG. 2, the marker generator 21 generated ten virtual markers K1-K10 each with a marker position mp. The virtual markers K1-K10 change their relative position pr on the basis of the movement of the conveying elements 31, 32, 33, 34 with respect to the system zero point Z according to the increase in the current position p of the relevant conveying element 31, 32, 33, 34, pr=p−mp. That is to say, the virtual markers K1-K10 are virtually transported by the conveying elements 31, 32, 33, 34. At the time of the example in FIG. 2, the virtual markers K1-K10 have relative positions with respect to the system zero point Z which correspond to a position of the virtual markers K1, K2, K3 on the conveying element 34, the virtual markers K3, K4 on the conveying element 33, the virtual markers K6, K7, K8 on the conveying element 32 and the virtual markers K9, K10 on the conveying element 31.

Figure 4A:
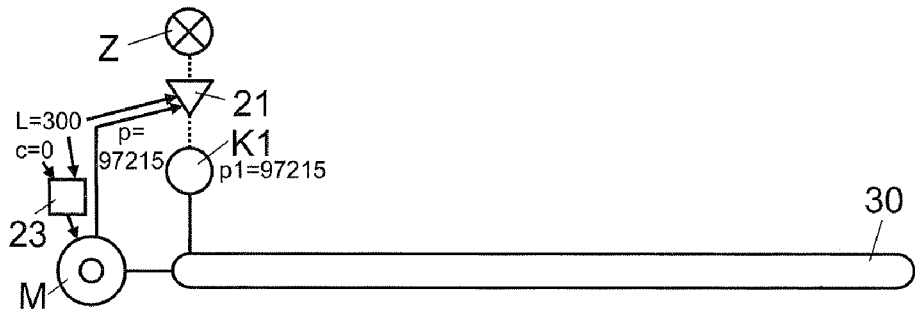
FIGS. 4a to 4d: illustrate the generation of virtual markers and their association with a conveying element and their relative position with respect to the current position of the conveying element.

FIG. 4a illustrates the generation of a virtual marker K1 by the marker generator 21 on the basis of the current position p=97215 mm of the conveying element 30 or the drive M. In this example, a length specification of L=300 mm for the regular distance between two virtual markers is predefined in an application-specific manner. The length specification corresponds, for example, to the length of a packaging bag (distance between two product leading edges). A correction value c which indicates, for example, the difference between the position of an actual product (for example a packaging film) and a desired position defined by the virtual markers is also continuously determined. In the example in FIG. 4a, there is no difference, the correction value is c=0, the control module 24 drives the drive M to run at a regular desired speed and the marker position p1 corresponds to the current position of the drive M or the conveying element 30, p1=97215 mm.

Figure 4B:
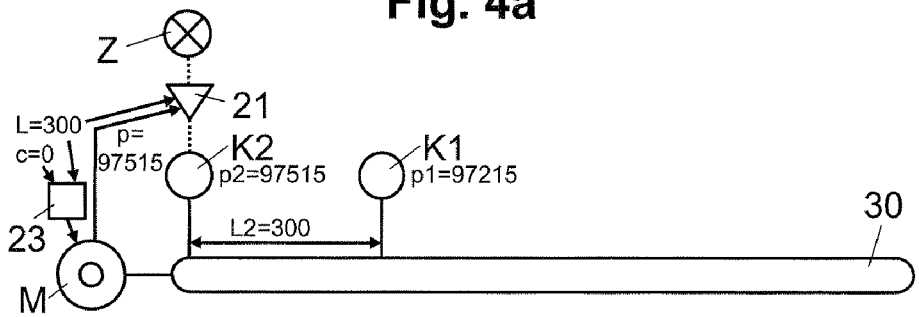

FIG. 4b illustrates the generation of another virtual marker K2 at the distance of L2=300 mm from the preceding marker K1. Again, there is no difference, the correction value is c=0, the drive M runs at a regular desired speed and the marker position p2 corresponds to the current position p=97515 mm of the drive M or the conveying element 30, p2=97515 mm.

Figure 4C:
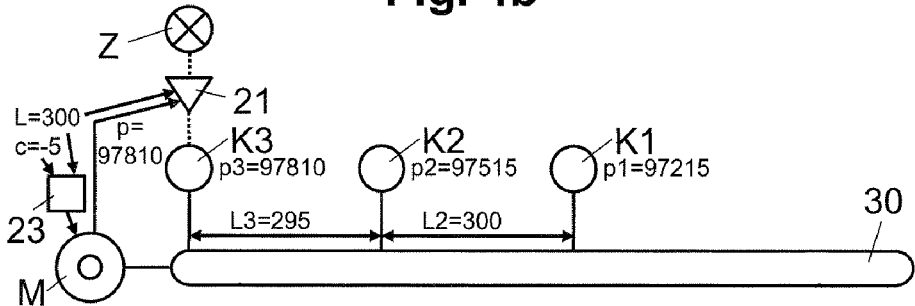

FIG. 4c illustrates the generation of another virtual marker K3. In the example in FIG. 4c, there is now a difference between the position of the actual product and the desired position defined by the virtual markers K1 and/or K2, which gives rise to a correction by a correction value of c=−5 mm. Owing to the correction value c=−5 mm, the forward feed of the conveying element 30 is reduced in such a manner that the distance between the marker K3 to be generated and the preceding marker K2 is reduced by the correction value c to L3=295 mm. So that the synchronization, for example with a fixedly clocked conveyor 300', is maintained, the control module 24 drives the drive M to run at a reduced speed vr, with the result that the corrected distance L3=295 mm is covered in the same time as is needed to cover the regular distance according to the length specification L=300 mm at the regular desired speed vs, vr=vs*L3/L. The marker position p3 corresponds to the current position of the drive M or the conveying element 30, p3=97810 mm.

Figure 4D:
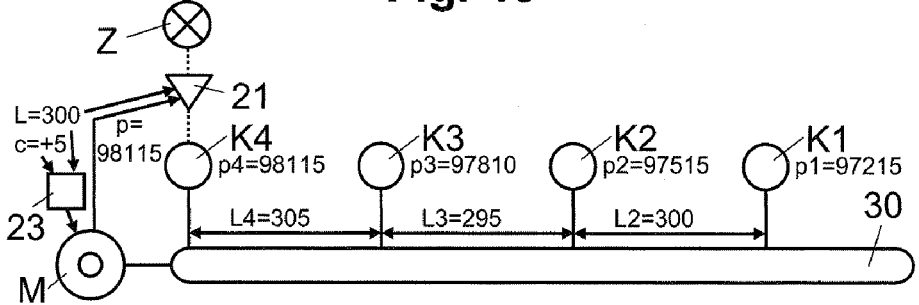

FIG. 4d illustrates the generation of another virtual marker K4. In the example in FIG. 4d, there is a difference between the position of the actual product and the desired position defined by the virtual markers K1-K3, which gives rise to a correction by a correction value of c=+5 mm. Owing to the correction value c=+5 mm, the forward feed of the conveying element 30 is increased in such a manner that the distance between the marker K4 to be generated and the preceding marker K3 is increased by the correction value c to L4=305 mm. So that the synchronization is maintained, the control module 24 drives the drive M to run at an increased speed vh, with the result that the corrected distance L4=305 mm is covered in the same time as is needed to cover the regular distance according to the length specification L=300 mm at the regular desired speed vs, vh=vs*L4/L. The marker position p4 corresponds to the current position of the drive M or the conveying element 30, p4=98115 mm.

FIGS. 5a to 5d illustrate the function of the transfer module 23 and the handling of virtual markers K1, K2 when changing from a supplying conveying element 31 to a removing conveying element 32. The transition point from the supplying conveying element 31 to the removing conveying element 32 is assumed to be at a distance d=500 mm from the starting point of the conveying elements 31, 32.

Figure 5A:
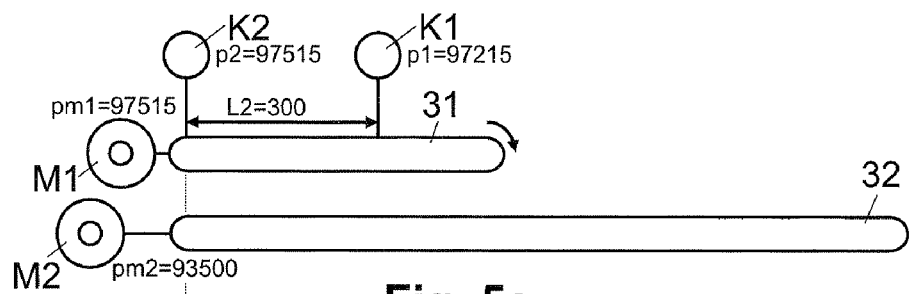
FIGS. 5a to 5d: illustrate the association of virtual markers when changing from a first conveying element to a second conveying element, in each case with the relative position of the virtual marker with respect to the current position of the associated conveying element.

In the starting position in FIG. 5a, the conveying element 31 driven by the drive M1 is at the position pm1=97515 mm and the conveying element 32 driven by the drive M2 is at the position pm2=93500 mm. For the example in FIGS. 5a-5d, it is assumed that the removing conveying element 32 is coupled to the supplying conveying element 31 with a factor of f=0.9, that is to say the removing conveying element 32 runs more slowly than the supplying conveying element 31, with the result that, when the supplying element 31 moves by 200 mm, the removing conveying element 32 moves by 180 mm, for example. In this starting position, the data memory 20 contains two virtual markers K1, K2 which are associated with the supplying conveying element 31 and have the marker positions p1=97215 mm and p2=97515 mm, which corresponds to a mutual distance of L2=300 mm.

Figure 5B:
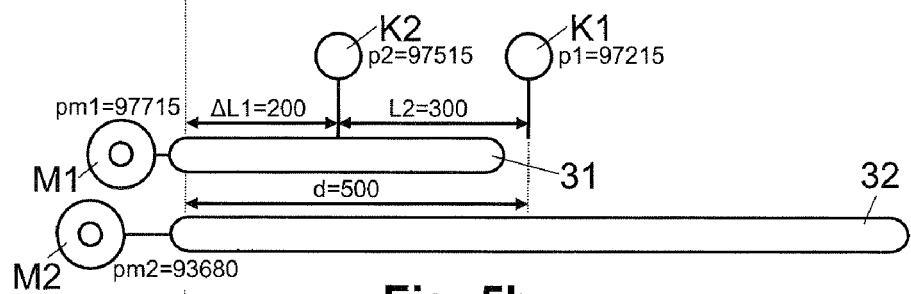

In the situation according to FIG. 5b, the supplying conveying element 31 has moved by ΔL1=200 mm, which corresponds to a current position of the supplying conveying element 31 of pm1=97715 mm. At the same time, the removing conveying element 32 has moved by ΔL1'=f*ΔL1=180 mm, which corresponds to a current position of the removing conveying element 32 of pm2=93680 mm. The relative position pr1 of the virtual marker K1 results from its marker position p1=97215 mm and from the current position pm1 of the supplying conveying element 31, pr1=pm1−p1=500 mm. That is to say, in the situation according to FIG. 5b, the virtual marker K1 has reached the transition point from the supplying conveying element 31 to the removing conveying element 32 (d=500 mm), thus activating the transfer module 23.

Figure 5C:
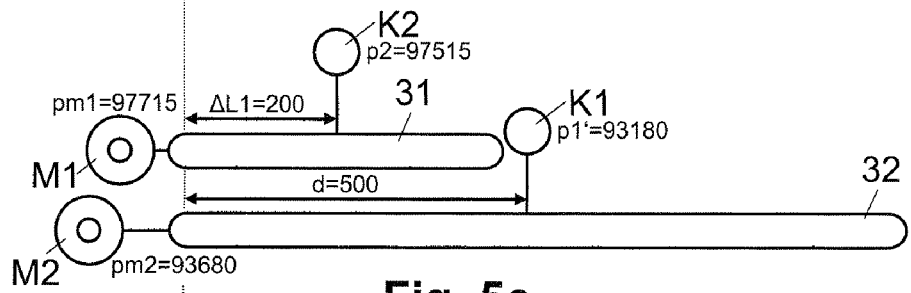

As schematically illustrated in FIG. 5c, the transfer module 23 transfers the virtual marker K1 from the supplying conveying element 31 to the removing conveying element 32. In this case, the virtual marker K1 is associated with the removing conveying element 32 in the data memory 20 and its marker position p1' with respect to the current position pm2=93680 mm of the removing conveying element 32 is determined, p1'=pm2−d=93180 mm, and is stored in the data structure of the virtual marker K1. In one embodiment variant, when changing from the supplying conveying element 31 to the removing conveying element 32, the marker position p1' of the virtual marker K1 is also defined (with a function f) on the basis of the mass of the conveyed product mp, the type tp of conveyed product and/or the speed vz of the supplying conveying element 31, p1'=pm2−d+f(mp, tp, vz).

Figure 5D:
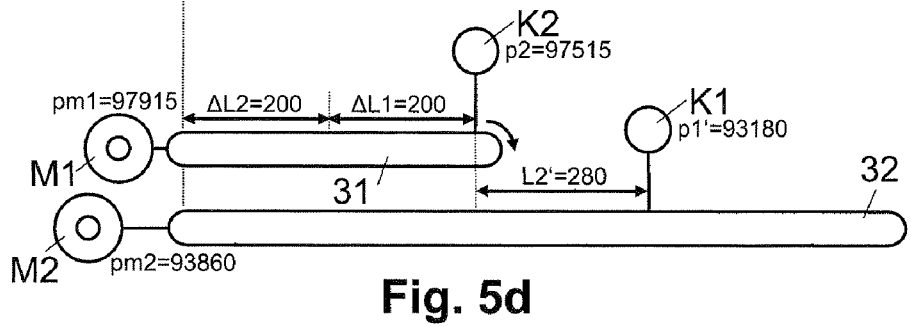

In the situation according to FIG. 5d, the supplying conveying element 31 has moved by a further ΔL2=200 mm, which corresponds to a current position of the supplying conveying element 31 of pm1=97915 mm. At the same time, the removing conveying element 32 has in turn moved by ΔL2'=f*ΔL2=180 mm, which corresponds to a current position of the removing conveying element 32 of pm2=93860 mm. The relative position pr2 of the virtual marker K2 results from its marker position p2=97515 mm and from the current position pm1 of the supplying conveying element 31, pr2=pm1−p2=400 mm. The relative position pr1' of the virtual marker K1 results from its marker position p1'=93180 mm and from the current position pm2 of the removing conveying element 32, pr1'=pm2−p1'=680 mm. That is to say, the distance between the virtual markers K1 and K2 has been shortened from the original value of L2=300 mm to L2'=pr1'−pr2=280 mm on account of the slower speed of the removing conveying element 32.

Figure 6:
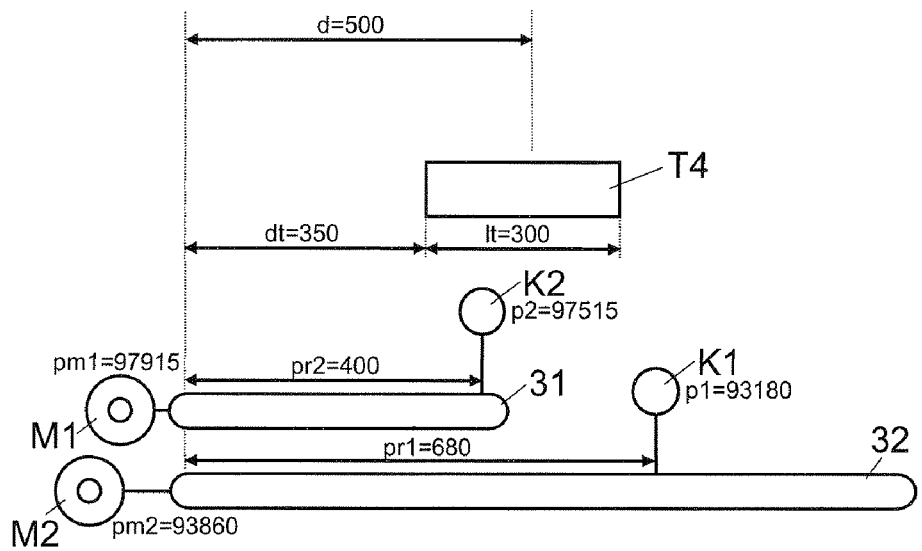
FIG. 6: illustrates a sector of the conveying system, which sector extends over a plurality of conveying elements and is used to search for virtual markers in this region.

FIG. 6 illustrates the function of the marker search module 22 using the example of a sector T4 which extends over two conveying elements 31, 32 in the transfer region at d=500 mm. The sector T4 has a starting point which is at a distance of dt=350 mm from the system zero point and has a length of lt=300 mm, that is to say the sector T4 is defined by the region [300 mm, 650 mm] with respect to the system zero point Z. The marker search module 22 is set up, when updating the positions of the conveying elements 31, 32 of the conveying system 3, to identify virtual markers K1, K2 which lie within one of the defined sectors T4 of the conveying system 3. That is to say, for the defined sectors T4 of the conveying system 3 which are stored in the data memory 20, the marker search module 22 searches for respective virtual markers K1, K2 in the data memory 20 which have a marker position which lies within the relevant sector T4 at the current search time. For this purpose, the current relative positions of the virtual markers K1, K2 with respect to the system zero point Z are determined. In the example in FIG. 6, a value of pr1=pm2−p1=680 mm results for the current relative position pr1 of the virtual marker K1 on the basis of the current position pm2 of the associated conveying element 32; a value of pr2=pm1−p2=400 mm results for the current relative position pr2 of the virtual marker K2 on the basis of the current position pm1 of the associated conveying element 31. The virtual marker K1 thus lies outside the sector T4 and the virtual marker K2 lies within the sector T4, and the marker search module 22 provides the control module 24 with the virtual marker K2 or its identification for further processing.

An exemplary sequence of steps for carrying out the computer-controlled conveying method and an exemplary application are described in the following sections with reference to FIGS. 7 and 9.

Figure 7:
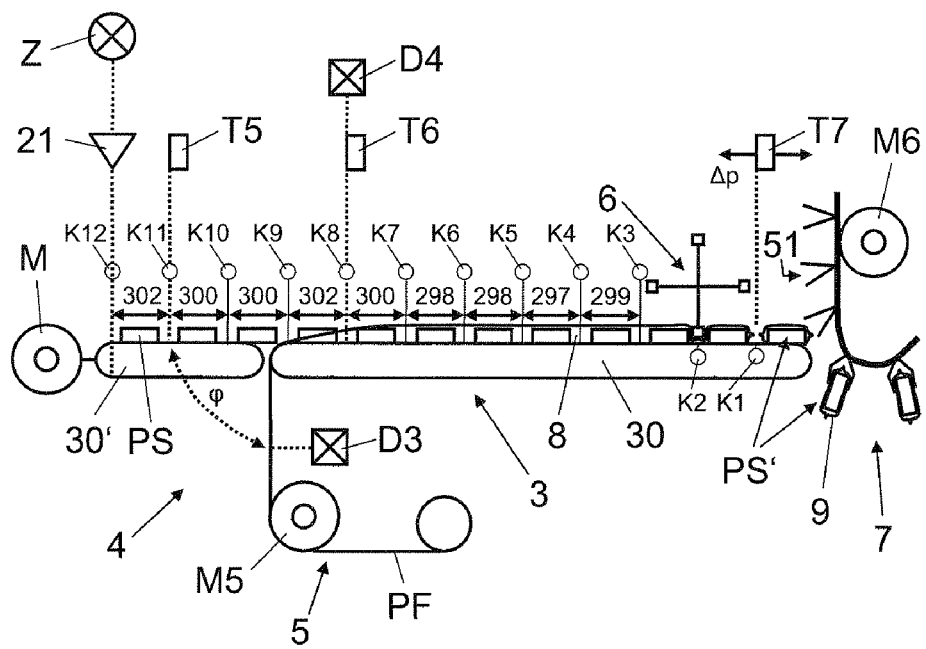
FIG. 7: shows a block diagram which schematically illustrates an example of a conveying element which is set up to accept flexible flat items from a fixedly clocked conveyor and packaging film from a variable film feeder, to supply them to a welding bar for bagging and to supply the items which have been bagged with the packaging film to a conveyor having a variable clock rate.

The exemplary application illustrated in FIG. 7 relates to a film packaging machine 4 for bagging flexible flat items PS, for example stacks of printed products. The film packaging machine 4 comprises a conveying system 3 or part of a conveying system comprising two conveying elements 30 and 30' which are coupled at the same speed and are driven by one or more drives M. A film feeder 5 which is driven by drive M5 continuously supplies the conveying element 30 with a packaging film PF which comes to lie on the conveying element 30. The packaging film PF has film markers which are applied, for example printed on, at regular distances, for example 300 mm, and make it possible to determine the position of the packaging film PF in its longitudinal direction. A fixedly clocked conveyor 300' (see FIG. 2) which is not illustrated in FIG. 7 supplies the conveying element 30' with the items PS at a respective defined distance of 300 mm, for example, between the transport cams 301 (or from start of the product to start of the product or from product leading edge to product leading edge). The conveying element 30' supplies the items PS to the conveying element 30, where they come to lie on the packaging film PF. The packaging film PF is wrapped around the items PS such that a continuous film bubble 8 forms around the items PS. The film bubble 8 is welded by the welding bar 6 to form bags 9, with the result that every item PS is packaged in an individual bag 9 which is welded on both sides (the welding of a continuous longitudinal seam is not discussed here). The packaged items PS' (in the welded bags 9) are removed by a conveyor 7 downstream of the conveying element. The conveyor 7 is driven by the drive M6 at an adjustable clock rate, a packaged item PS' being gripped by a clamp 51 and being conveyed away with each clock pulse.

Figure 9:
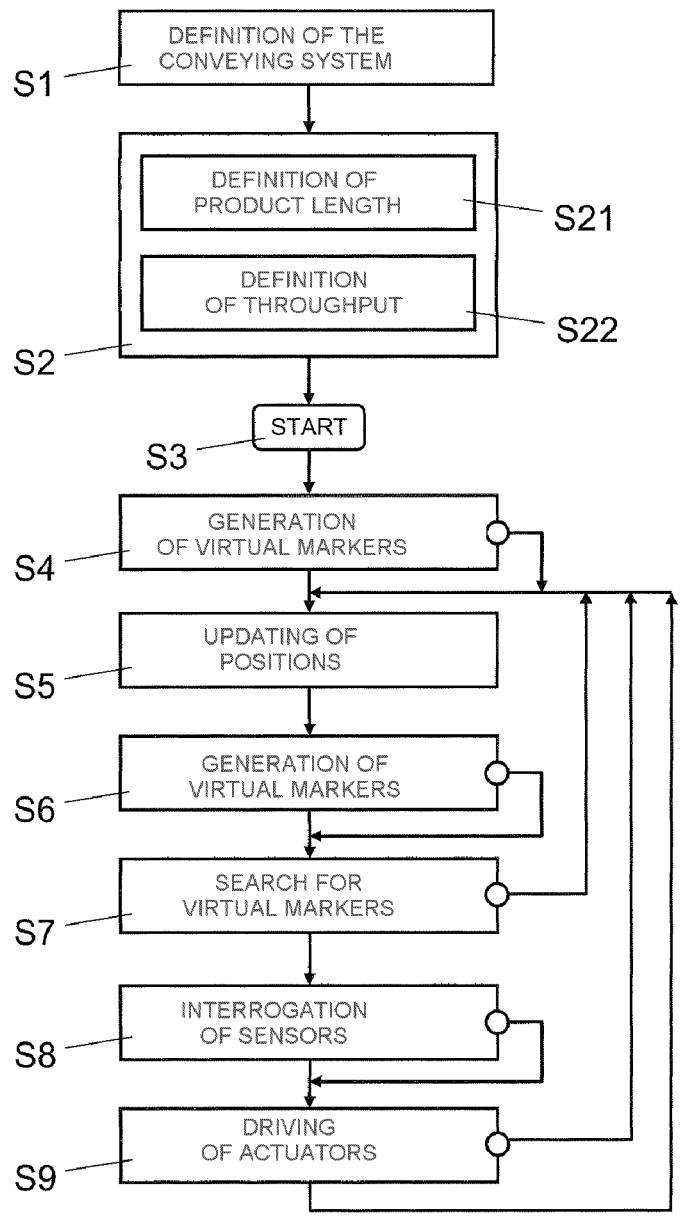
FIG. 9: shows a flowchart which illustrates an example of a sequence of steps for carrying out a computer-controlled conveying method.

In FIG. 9, the reference symbols S1 and S2 relate to preparatory steps for carrying out the computer-controlled conveying method.

In step S1, the conveying system 3 is defined by inputting and storing system components, system parameters and system rules, for example using a graphical user interface (GUI). In step S1, one or more conveying elements 30, one or more marker generators 21 and one or more marker search modules 22 for one or more sectors T5, T6, T7 are defined, in particular, as system components or system parameters for the conveying system 3. The conveying elements 30, 30' are defined by their length and distance from the system zero point Z. The arrangement of the conveying elements 30, 30' and their speed-related mutual coupling and, optionally, a type of conveying element are also defined. The arrangement of the conveying elements 30, 30' comprises, for example, one or more sequential sequences, branches and/or combinations. As mentioned above, the sectors T5, T6, T7 are defined by their position and length. In one variant, the position of a sector T5, T6, T7 is also tied, as a variable position $\Delta p$, to the (current) speed of an associated conveying element 30. The marker generators 21 are defined by their distance from the system zero point Z and by rules for generating virtual markers K1-K12. A rule defines, for example, the generation of the virtual markers K1-K12 on the basis of the current position of an associated conveying element 30 with a product-specific distance. The generation of the virtual markers K1-K12 is optionally coordinated/synchronized with a current product position, for example on the basis of the output from a sensor and/or the presence of a virtual marker in a defined sector T5.

In step S2, operation-specific parameters are input and are stored in the data memory 20. These parameters may also be dynamically changed by an authorized person during operation. In step S21, a product-specific length is detected; 300 mm for the distance in supplying the items PS and for the corresponding distance between the film markers in the present example. In step S22, the operating speed or throughput is detected, for example the number of items PS per unit time, for example 30000 items per hour.

In step S3, the conveying system 3 is started up and operation is begun. In this case, the system zero point Z is preferably set to a starting point, for example to zero.

In step S4, a check is first of all carried out in order to determine whether virtual markers K1-K12 are already intended to be generated by at least one of the marker generators 21 at the starting point. If this is not the case, the conveying method continues in step S5. Otherwise, the corresponding virtual markers K1 are generated by the relevant marker generator 21 on the basis of the current position of the associated conveying element 30 and the relative position of the relevant marker generator 21 and are stored in the data memory 20. In the present example, the virtual markers K1-K12 each represent the start (or end) of the bags 9 which are formed around the items PS.

In step S5, the current positions of the conveying elements 30 are detected, for example periodically according to a defined interval of time or each time a position sensor N1, N2, N3 is increased by a defined value (increment).

In step S6, a check is carried out in order to determine whether virtual markers K1-K12 are intended to be generated by at least one of the marker generators 21 at the current positions of the conveying elements 30. If this is not the case, the conveying method continues in step S5 with the next update of the current positions. Otherwise, the corresponding virtual markers K1-K12 are generated as described above and are stored in the data memory 20, if appropriate while taking into account current correction values c. In the present example, the virtual markers K1-K12 are each generated with a mutual distance which corresponds to the product-specific length of 300 mm defined in step S21. In this case, however, correction values c are taken into account, as described below.

In step S7, the marker search module 22 searches for virtual markers K1-K12 which have a current relative position within a defined sector T5, T6, T7. In one embodiment variant, the calculated current relative positions of the virtual markers K1-K12 are stored in the data memory 20. In addition, virtual markers K1-K12 whose current relative positions lie outside a defined total length of the conveying system 3 are deleted in the data memory 20 since they leave the conveying system 3 or part of a conveying system. If no virtual markers K1-K12 lying within the sectors T5, T6, T7 are found, the conveying method continues in step S5 with the next update of the current positions. Otherwise, the conveying method continues in step S8. In the present example according to FIG. 7, the marker search module 22 finds the virtual marker K11 in the sector T5, the virtual marker K8 in the sector T6 and the virtual marker K1 in the sector T7.

In step S8, the control module 24 checks whether the virtual markers K1-K12 found in step S7 are associated with sensors which are needed to further process the virtual markers K1-K12 which have been found. If the virtual markers K found are not associated with any sensors D3, D4 to be taken into account, the conveying method continues in step S9. Otherwise, the control module 24 obtains the current sensor values from the relevant sensors D3, D4 and continues in step S9. In the present example, the sensor D3 is associated with the sector T5 and the sensor D4 is associated with the sector T6. A person skilled in the art will understand that, in an alternative embodiment variant, a sensor can trigger the search for virtual markers in an associated sector. In one embodiment variant, a sensor triggers the generation of one or more virtual markers (activation of the marker generator 21) which represent, for example, the position of an item detected using sensor technology.

In the present example, the sensor D3 is in the form of a photosensor/light barrier, for example, and is set up to detect the film markers applied to the packaging film PF in order to determine the position of the packaging film PF in its longitudinal direction. The sensor D3 is positioned in such a manner that it detects the film marker at a point which, "folded up" by the angle φ on the conveying element 30', corresponds to the position of the expected start of a bag (K11) between two supplied items PS. The position of the film mark is thus determined by the relative position of the sensor D3 with respect to the start of the conveying element 30' (here system zero point Z) and the current position of the drive M.

In the present example, the sensor D4 is in the form of a light barrier, for example, and is set up to detect whether the items PS are separated from one another at the relevant point and the packaging film PF can therefore be welded in the empty region between the items PS. The sensor D4 is positioned (for example centred) within the sector T6, where the start of a bag (K8) is expected to come to lie.

In step S9, the control module 24 checks whether actuators of the conveying system 3 are intended to be driven on the basis of the virtual markers K1-K12 found in step S7 and/or the sensor values detected in step S8, for example a functional unit which is intended to be activated or deactivated, or drives of conveying elements whose speed or operating clock rate is intended to be changed, and/or whether a correction value c is intended to be defined and stored in order to generate the next virtual markers K1-K12 of a conveying element 30. If appropriate, the relevant actuators are driven in step S9 or correction values c are calculated and stored, and the conveying method continues in step S5 with the next update of the current positions. Some examples of the control of actuators on the basis of detected virtual markers are described below.

If, in the example in FIG. 7, the virtual marker K11 found in the sector T5 differs from the position of the film marker, as detected by the sensor D3, the control module 24 determines a corresponding correction value c in step S9, c=+2 mm in the present example. The control module 24 drives the drive M as an actuator in step S9 such that the conveying elements 30, 30' cover a length increased to 302 mm at an increased speed in the time in which 300 mm are covered at the regular desired speed, as described in connection with FIG. 4d. The next virtual marker K12 generated in step S6 will therefore be at a distance of 302 mm from the preceding virtual marker K11. In the case of a negative correction value, for example c=−3 mm, the control module 24 would drive the drive M as an actuator such that the conveying elements 30, 30' cover a shorter length of 297 mm at a reduced speed in the time in which 300 mm are covered at the regular desired speed, as described in connection with FIG. 4c. The virtual marker K12 would thus be generated at a distance of 297 mm from the virtual marker K11. The sensor D3 and the associated sector T5 thus make it possible, on the basis of the virtual markers K1-K12, to synchronize the packaging film PF or the film markers applied to the latter with the fixed clock rate of the supplied items PS.

If, in the example in FIG. 7, the sensor D4 also detects that there is no separation in the case of the virtual marker K8 found in the sector T6, that is to say an item PS is incorrectly at the point at which the start of a bag would normally come to lie, the control module 24 drives the welding bar 6 as an actuator in a preparatory manner in step S9 such that the welding bar 6 is lifted if the virtual marker K8 arrives at the welding bar 6. In addition, the relevant virtual markers K8 are each stored in the data memory 20 in association with a corresponding error value which indicates that there is no separation in the case of the virtual markers K8. On the basis of the virtual markers K1-K12, the sensor D4 and the associated sector T6 thus make it possible to prevent the welding bar 6 from welding the film if the items PS are not adequately separated from one another. In one embodiment variant, the sensor D4 and the associated sector T6 are arranged in the conveying element 30'.

On the basis of the virtual markers K1-K12 found in the sector T7, the control module 24 determines the actual clock rate of the welded bags 9 which are transported from the conveying element 30 to the conveyor 7 in the example in FIG. 7. On the basis of the actual clock rate determined, the control module 24 determines a desired clock rate for the conveyor 7 in step S9 and drives the drive M6 as an actuator in order to drive the conveyor at the desired clock rate determined. For this purpose, the marker position of the relevant virtual marker K1-K12 is respectively taken into account; in one embodiment variant, the sector T7 is defined with such a short length that it suffices to detect the presence of a virtual marker K1-K12 in the sector T7 in order to determine the desired clock rate.

In the example in FIG. 7, the control module 24 also determines, on the basis of the error values stored in the data memory 20, whether there is insufficient separation or a lack of separation, as previously detected by the sensor D4, in the case of the virtual markers K1 found in the sector T7 (or in another sector provided for this purpose. If there is a lack of separation, the control module 24 drives the relevant clamp 51 as an actuator in step S9 such that the relevant clamp 51 is closed or not opened, with the result that the bag which has not been separated and contains the items PS which have not been separated is not gripped by the clamp and is segregated as scrap. In accordance with the switching time of the clamps 51, the variable position Δp of the sector T7 is adapted in this case to the (current) speed of the conveying element 30 in order to detect virtual markers K1-K12 with a lack of separation at a sufficiently early time. In one embodiment variant, the film packaging machine 4 is set up in such a manner that the lack of items PS at the envisaged points is also detected and recorded in order to likewise segregate empty bags, which are welded by the welding bar 6 even if items PS are missing, and to avoid transferring them to the clamps 51 of the conveyor 7.

Figure 8:
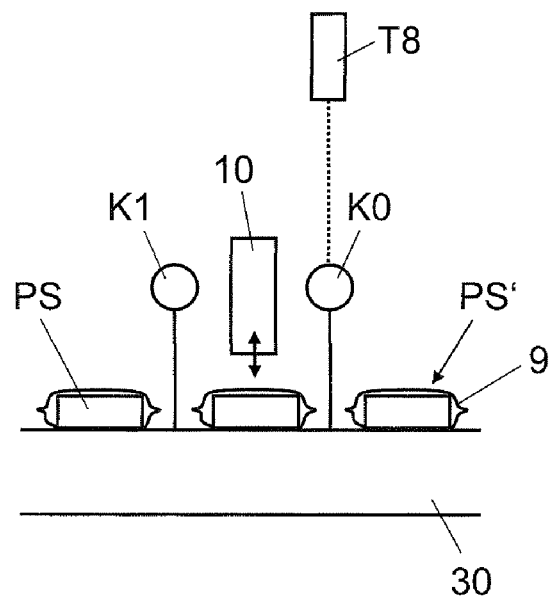
FIG. 8: shows a block diagram which schematically illustrates an example of an operation of processing bagged items on the basis of detected virtual markers.

FIG. 8 illustrates another example of control of actuators on the basis of detected virtual markers. As soon as a virtual marker KO is found in the sector T8, the control module 24 drives the actuator in step S9 in order to activate (or deactivate) the functional unit 10. The functional unit 10 is a processing unit, for example an address applicator which applies an address to an item PS or to a bagged item PS', for example by means of printing. The item PS or the bagged item PS' is thus processed (printed, addressed) automatically by the functional unit 10 as soon as the virtual marker KO reaches the sector T8.

The invention claimed is:

1. A computer-controlled conveying system comprising:
at least one conveying element having a drive and a position sensor for indicating a current position of the conveying element;
at least one marker generator configured to generate virtual markers associated with the conveying element, the virtual markers each being stored with a marker position which reflects the current position of the conveying element at the time of generation;
at least one marker search module for searching for virtual markers which have a relative position with respect to the associated conveying element that lies within a defined sector at the search time; and
a control module configured to drive an actuator of the conveying system depending on whether virtual markers were found in the defined sector by the marker search module.

2. The conveying system according to claim 1, wherein:
the marker generator is configured to generate the virtual markers with product-specific distances between the marker positions,
the conveying system comprises a sensor for determining a current product position of a product conveyed on the conveying element, and
the marker generator is configured to respectively vary the marker position using the current product position when generating a virtual marker.

3. The conveying system according to claim 1, wherein:
a conveyor with an adjustable clock rate for removing products is downstream of the conveying element, and
the control module is configured to determine a desired clock rate using marker positions of virtual markers found in the defined sector and to drive the downstream conveyor at the desired clock rate.

4. The conveying system according to claim 1 wherein:
the drive of the conveying element has an adjustable speed, and
the control module is configured to define the sector using the speed of the conveying element.

5. The conveying system according to claim 1, wherein:
the conveying system comprises a sensor for detecting a product conveyed on the conveying element,
the sensor is associated with the sector, and
the control module is configured to drive the actuator based on the detection of the product when a virtual marker lying in the sector is found.

6. The conveying system according to claim 5, wherein:
the virtual marker represents an intermediate space between successive items which is provided for the purpose of welding packaging,
the actuator is in the form of a welding bar,
the sensor is in the form of a light barrier, and
the control module is configured to drive the welding bar depending on whether the light barrier detects a conveyed product.

7. The conveying system according to claim 1, wherein:
the marker generator is configured to respectively calculate the marker position of a virtual marker on the basis of the current position of the associated conveying element at the time of generation and a distance value from a system zero point, the value being associated with the marker generator, and
the marker search module is configured to respectively calculate the relative position of a virtual marker on the basis of the marker position of the relevant virtual marker and the current position of the associated conveying element at the search time.

8. The conveying system according to claim 1 wherein:
the conveying system comprises a plurality of conveying elements, and
the conveying system comprises a transfer module which is configured to transfer a virtual marker of a first conveying element to a downstream second conveying element when a transfer point to the downstream second conveying element is reached.

9. The conveying system according to claim 8 wherein:
at least some drives of the conveying elements have different drive speeds, and
the transfer module is configured to determine the reaching of the transfer point for a virtual marker of the first conveying element on the basis of the current position of the first conveying element, to associate the virtual marker with the downstream second conveying element at the transfer point, and to adapt the marker position of the virtual marker using the current position of the second downstream conveying element.

10. The conveying system according claim 8, wherein the transfer module is configured to determine the marker position of the virtual marker on the second conveying element using at least one of the following: speed of the first conveying element, mass of a conveyed product and type of conveyed product.

11. The conveying system according to claim 1 wherein:
the drive of the conveying element has an adjustable speed,
a fixedly clocked conveyor for supplying items is upstream of the conveying element, and
the marker generator is configured to generate the virtual markers with distances which are dependent on length specifications associated with the items and to respectively vary the distance from the preceding virtual marker and the speed of the conveying element using current product positions of products on the conveying element when generating a virtual marker.

12. The conveying system according to claim 1 wherein:
a film feeder for feeding a film provided with film markers to the conveying element is upstream of the conveying element,
the conveying system comprises a sensor for determining a product position of the film using the film markers,
a fixedly clocked conveyor for supplying items is upstream of the conveying element and
the marker generator is configured to generate the virtual markers with product-specific distances between the marker positions and to respectively adapt the film feeder and the relevant marker position to reflect a difference between the product position of the film and the marker position of a previously generated virtual marker when generating a virtual marker.

13. A computer-controlled conveying method performed in a system in which a conveying element is driven by a drive which indicates a current position of the conveying element, the method comprising:
- generating virtual markers and storing the virtual markers in association with the conveying element, the virtual markers each comprising a marker position that reflects the current position of the conveying element at the time of generation;
- conducting a search for stored virtual markers which have a relative position with respect to the associated conveying element that lies within a defined sector at the search time; and
- driving an actuator of the conveying system depending on whether virtual markers were found in the defined sector during searching.

14. The method according to claim 13, wherein:
- the virtual markers are generated with product-specific distances between the marker positions,
- a current product position of a product conveyed on the conveying element is determined by a sensor, and
- the marker position is respectively varied using the current product position when generating a virtual marker.

15. The method according to claim 13, wherein:
- products are removed from the conveying element by a conveyor with an adjustable clock rate,
- a desired clock rate is determined using marker positions of virtual markers found in the defined sector, and
- the conveyor is driven at the desired clock rate.

16. The method according to claim 13 wherein the sector is defined using the speed of the conveying element.

17. The method according to claim 13, wherein the actuator is driven by a sensor associated with the sector when a virtual marker lying in the sector is found on the basis of detection of the product.

18. The method according to claim 13 wherein:
- the marker position of a virtual marker is respectively calculated the basis of the current position of the associated conveying element at the time of generation and on the basis of a defined distance value from a system zero point, and
- the relative position of a virtual marker is respectively calculated using the marker position of the relevant virtual marker and the current position of the associated conveying element at the search time.

19. The method according to claim 13, wherein:
- the method further comprises determining, using the current position of a first conveying element, whether a virtual marker of the first conveying element -reaches a transfer point to a downstream second conveying element, and
- the virtual marker is associated with the downstream second conveying element when the transfer point is reached, the marker position of the virtual marker being adapted using the current position of the second downstream conveying element.

20. The method according to claim 19, wherein the marker position of the virtual marker on the second conveying element is determined on the basis of at least one of the following: speed of the first conveying element, mass of a conveyed product and type of conveyed product.

21. A Computer program product comprising a non-transitory computer-readable medium having computer code which is configured to control one or more processors of a control computer of a conveying system in such a manner that:
- a current position of a conveying element is detected by the control computer,
- virtual markers are generated in the control computer and are stored in association with the conveying element, the virtual markers each comprising a marker position that reflects the current position of the conveying element at the time of generation,
- a search is carried out for virtual markers which are stored in the control computer and have a relative position with respect to the associated conveying element that lies within a defined sector at the search time, and
- the control computer drives an actuator of the conveying system depending on whether virtual markers were found in the defined sector.

* * * * *